April 25, 1933. J. T. AVILA 1,905,881
AUTOMOBILE COMMODE
Filed July 29, 1932
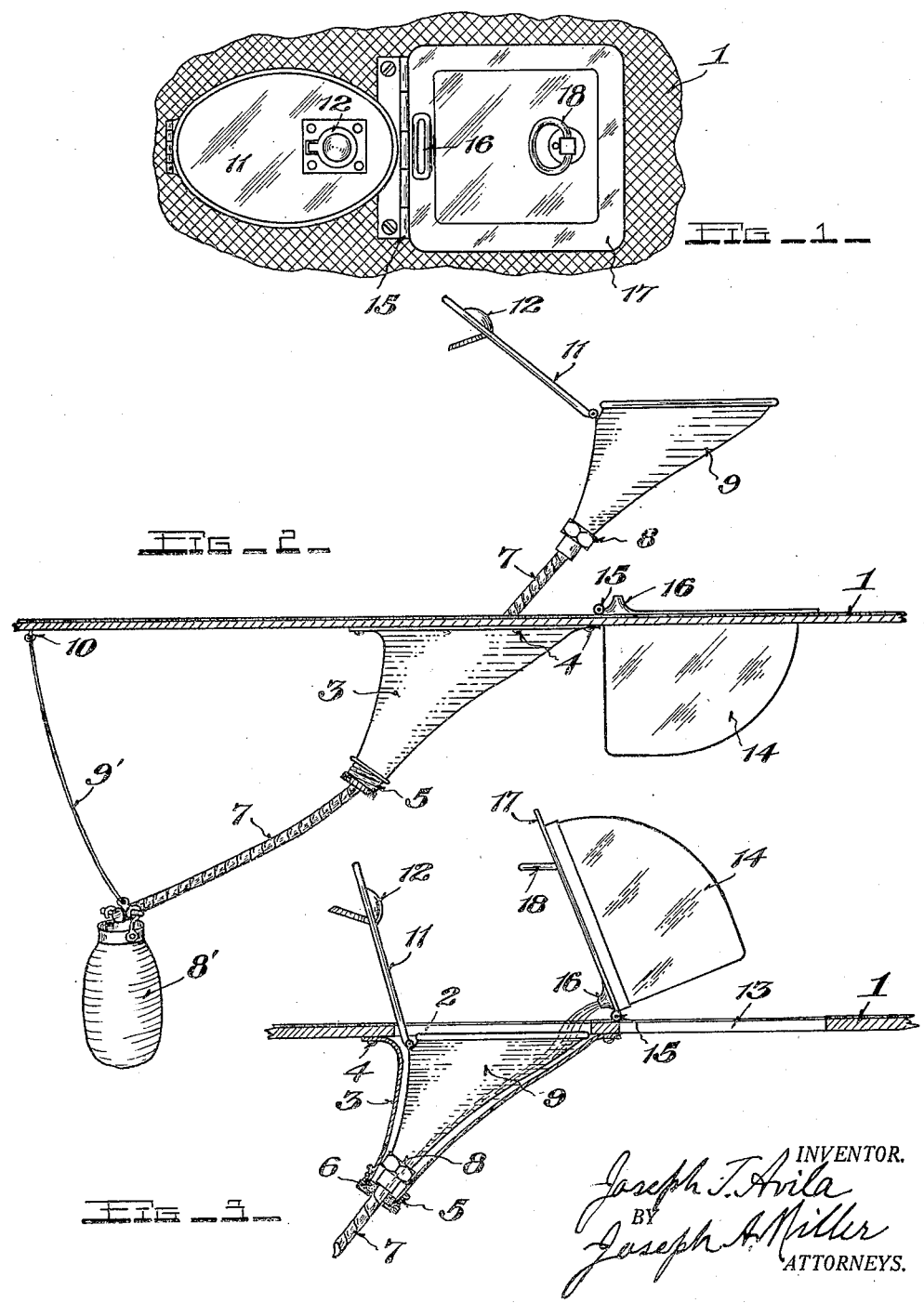

Patented Apr. 25, 1933

1,905,881

UNITED STATES PATENT OFFICE

JOSEPH T. AVILA, OF PROVIDENCE, RHODE ISLAND

AUTOMOBILE COMMODE

Application filed July 29, 1932. Serial No. 625,911.

This invention relates to automobile commodes, and the primary object thereof is to provide a device of this kind which includes a receiver that is normally housed beneath the floor board of the automobile and which may be easily and quickly moved into and out of operative position, and to further provide flushing means which normally is disposed beneath the floor board and which may be easily and quickly moved into and out of flushing position, for the purpose of flushing the receiver.

In the drawing:

Figure 1 is a top plan view of the invention showing the same applied to an automobile floor board.

Figure 2 is a side elevation showing the floor board in section and the receiver in operative position, and Figure 3 is a view similar to Figure 2 showing the parts in flushing position of the receiver.

In proceeding in accordance with the present invention the floor board 1 of the automobile is provided with an opening 2 which is in register with a housing 3 that is secured to the underside of the floor board 1 by means of fastenings 4. The housing is preferably of oval form and tapers throughout its length as depicted in the drawing. Both of the ends of the housing are open and the lower end is provided with a threaded cap 5 having a felt washer 6 which latter constitutes a cleaning or wiping member for the periphery of a flexible pipe 7. The pipe 7 at its upper end is connected by means of a coupling 8 to a receiver 9, the latter generally conforming in shape to that of the housing 3 and is movable into and out of the same. The opposite end of the flexible pipe 7 is connected to a suitable container 8' which latter may be of varying form or size and which is connected to a spring wire 9' which latter in turn is secured at 10 to the floor board 1.

The receiver 9 is normally closed by a hinged cover or lid 11 which has a handle 12, the floor board is further formed with an opening 13 adjacent to the opening 2 and in which is receivable a water container 14 which is hinged at 15 to the floor board. The water container is provided with an outlet 16 and has a removable top 17 provided with a handle 18, the top in normal position of the parts, as shown in Figures 1 and 2, having its marginal portions seated upon the floor board in order to support the container in the position depicted in Figure 2.

Normally the parts occupy the position shown in Figure 1 in which receiver 9 is in the housing 3 and is closed by the cover 11, the water container being in the position of Figure 2 in which same is disposed beneath the floor board. When the device is to be used the receiver 9 is withdrawn from the housing 3 to the desired extent so as to be convenient to the user, the contents emptying into the container 8'. After use, the receiver is moved into the housing to occupy the position shown in Figure 3, whereupon the container 14 is swung upwardly into the position shown in Figure 3 so that any desired quantity of water from the container gravitates into and thus automatically flushes the receiver 9. It will be seen that during movement of the flexible pipe 7 into and out of operative position the wiping member 6 will clean the exterior of the pipe. It will be further noted that the container 8' acts to tension the pipe 7 so as to facilitate movement thereof during movement of the receiver to normal position.

What is claimed is:

1. In combination with an automobile floor board having openings, an open ended housing in register with one of the openings secured to the floor board and depending therefrom, a removable closure for the top of the housing, a receiver having a removable cover movable into and out of the housing, a flexible pipe connected at its upper end to the receiver and extending through the housing, a container connected to the lower end of the pipe, a flexible connection secured to the floor board and to the container to support the latter, and a flushing water container hinged to the floor board and movable into and out of the other opening in the floor board and having an outlet which when the water container is swung upwardly discharges water into the receiver to flush same.

2. In combination with an automobile floor board having openings, a housing in one of the openings secured to and depending from the floor board, a receiver movable into and out of the housing, a pipe connected to the lower end of the receiver, a container connected to the pipe, means to suspend the container from the floor board, and a flushing water container in the other floor board opening hinged to the floor board and normally disposed therebeneath and having an outlet which when the water container is swung upwardly discharges into the receiver to flush the latter.

3. In combination with an automobile floor board having openings, an open ended housing in register with one of the openings secured to the floor board and depending therefrom, a receiver having a removable cover movable into and out of the housing, a flexible pipe connected at its upper end to the receiver and extending through the housing, a container connected to the lower end of the pipe, means secured to the floor board and to the container to support the latter, and a flushing water container hinged to the floor board and movable into and out of the other opening in the floor board and having an outlet which when the water container is swung upwardly discharges water in the receiver to flush same.

4. In combination with the floor board of an automobile having an open ended member secured thereto and depending therefrom, a receiver movable into and out of said member, a conduit connected to the receiver for movement therewith and extending through the member to discharge the contents of the receiver beneath the floor boards, and means associated with the member and engaging the periphery of the conduit to clean the latter during said movement of the latter.

In testimony whereof I have signed my name to this specification.

JOSEPH T. AVILA.